Dec. 9, 1958   A. C. R. VAUTIER   2,863,620
JET-PROPELLED AIRCRAFT

Filed Jan. 2, 1953   8 Sheets-Sheet 2

Dec. 9, 1958  A. C. R. VAUTIER  2,863,620
JET-PROPELLED AIRCRAFT

Filed Jan. 2, 1953  8 Sheets-Sheet 3

Fig. 7

Dec. 9, 1958   A. C. R. VAUTIER   2,863,620
JET-PROPELLED AIRCRAFT
Filed Jan. 2, 1953   8 Sheets-Sheet 4

A. C. R. VAUTIER 2,863,620

JET-PROPELLED AIRCRAFT

Filed Jan. 2, 1953

Dec. 9, 1958　　A. C. R. VAUTIER　　2,863,620
JET-PROPELLED AIRCRAFT

Filed Jan. 2, 1953　　　　　　　　　　　　8 Sheets-Sheet 8

_United States Patent Office_

2,863,620
Patented Dec. 9, 1958

2,863,620

JET-PROPELLED AIRCRAFT

André Charles René Vautier, Paris, France, assignor to Sud-Aviation Societe Nationale de Constructions Aeronautiques, Paris, France Application January 2, 1953, Serial No. 329,163

Claims priority, application France October 4, 1952

11 Claims. (Cl. 244—15)

In most constructions of aerodynes propelled by jet engines, an even number of jet engines are mounted within the wings and equally distributed on either side of the fuselage, while other jet engines may be accommodated within the fuselage. If the jet engines are provided in odd number, one is located in the fuselage tail. Such a mounting of side engines within the wings results in a complicated wing structure due to the main spars having to pass above and beneath the engines. Furthermore, carefully designed fairings must be provided to join the projecting parts with the wing surface.

In other constructions, side engines have been positioned under the fuselage ahead of the wings in order to save weight by a simpler wing structure while improving the aerodynamic efficiency of the wings. Such a construction, however, involves substantially heavier landing gear since the latter must extend higher to provide a suitable clearance between the ground and the engines. Besides, passengers are greatly disturbed by the noise of engines located in this manner since the noise directly strikes the cabin bottom whereas the noise of wing engines is muffled by the wing structure itself.

Furthermore, a major drawback of arranging the engines under the fuselage is to substantially impair passenger safety due to the possibility of fire or explosion in the engines under the fuselage. The risks of fire and explosion are greatly increased in the event of a landing with retracted landing wheels.

It is accordingly an object of the invention to remove the deficiencies of the above mentioned constructions, and for this purpose the invention contemplates providing an aerodyne having at least two jet engines which are mounted on a fuselage at positions located both longitudinally and vertically between its wings and tail surfaces and in nacelles structurally independent of said fuselage and supported on either side of the latter by streamlined structures.

Preferably, the axes of such lateral jet engines are substantially at the same level as the longitudinal fuselage axis and are substantially parallel to the longitudinal plane of symmetry of the aerodyne. However, said engine axes could be higher or lower than as noted above without departing from the spirit of the invention. Such modification might, however, change the order of importance of some of the hereinafter mentioned advantages of the invention. Consequently, the preferred engine thrust passes substantially through the center of gravity of the aerodyne.

An aerodyne equipped with two lateral engines arranged as described above may have a third main jet engine, or one or more smaller auxiliary jet engines used as auxiliary booster engines, said third engine or auxiliary engines being located in the tail portion of the fuselage with their axes substantially at the same level as the longitudinal fuselage axis.

Of course, for symmetry, the two lateral engines have the same power so that the resultant of the engine thrusts will normally remain in the plane of symmetry of the aerodyne. When utilizing a third or central engine, the power of the central engine may be varied with respect to the lateral engine power and may be either more or less powerful than the lateral engines.

When there is a central engine accommodated in the fuselage tail, it can be conveniently fed through a pair of air intakes suitably blended with the streamlined structures carrying the independent nacelles or through a single air intake formed above the fuselage as a continuation of the forward fairing surface of the lower part of the fin.

The invention has also for an object to provide means to fix adjustably the lateral jet engines along the fuselage of an aerodyne of the character described, during the construction or use thereof in order to permit of easily adjusting the position of nacelles lengthwise within limits wide enough to maintain a proper mean location with a possible variation of the lateral engine weight, which limits are predetermined data when planning the adaptation of said lateral engines on the aerodyne.

Owing to the novel arrangement of the lateral jet engines according to the invention, an aerodyne may be constructed with very low wings, low undercarriages and a reduced clearance between fuselage and ground, which facilitates loading, such an aerodyne being suitable for passengers or freight transport or for military operations, such as bombing for instance.

The lateral engines may be placed at a shorter distance from each other than when they are mounted within the wings. On the other hand, these lateral engines are located higher, as well as the air intakes, of the engine or engines mounted within the fuselage, when there are such, so that they are protected against damages by materials from the ground.

Owing to the position of the engine preferably behind the passenger cabin, the comfort is substantially improved by the almost complete elimination of noise, which permits also a substantial weight reduction as the soundproofing devices of the passenger cabin may be lighter. Moreover, such a position of the lateral engines improves the safety of the passengers against engine fire or explosion and more particularly in a belly landing with retracted wheels, owing to the position of the engine higher above the ground and away from the fuel tanks, which generally are within the wings. Another weight reduction may consequently be obtained by dispensing with automatic engine stopping devices.

Another advantage is obtained by the position of the lateral engine nacelles in a region where the actual local air flow speed is substantially equal to the air speed of the aerodyne, irrespective of the external conformation thereof. Wind tunnel tests have shown that the air supply is good at any speed since the lateral spacing of the engines from the fuselage permits said engines to be clear away from the boundary layer of the fuselage, even in the case of side-slip since the wake of the wings passes well beneath the nacelles owing to the deflection resulting from the low position of the wings. Further the location of said engines at a level above the low wings but below the tail surfaces keeps their intake clear of the downwash from the wings and the tail surfaces outside the blast of said engines.

Moreover, the lateral engines are made more accessible by the provisions of hinged semi-circular cowlings, which facilitates maintenance.

A substantial weight reduction is also obtained, when there is a central engine, by its fixation through structural members of the fin, and also by the arrangement of two air intakes within the streamlined supports of the lateral engine nacelles, which arrangement provides also an advantageous aerodynamic design. Furthermore, said central engine is made readily accessible through a large removable cowling of the tail.

Moreover, the mechanical and electrical connections and the fluid circuits are greatly simplified by the jet power plants being grouped in the same quarter of the aerodyne.

The following additional advantages are obtained when the aerodyne is only equipped with two lateral engines:

(a) Greatly simplified construction of the fuselage tail, which portion then does not require any reinforcement for central or auxiliary engines nor any removable cowling.

(b) Up-to-date and more powerful jet engine may be used to give the same total power, such up-to-date engine being provided with the last technical improvements and consequently having a lower specific fuel consumption.

(c) Facility of maintaining the longitudinal balance despite heavier lateral engines owing to the absence of a central engine or auxiliary engines.

(d) No air intake contrivances for a central engine or auxiliary engines.

(e) The number of the engine control and feed circuits reduced by one third, which substantially simplifies the installation of the crew compartment.

(f) A convenient central structural ladder may be arranged axially to open under the aerodyne, owing to the absence of a central engine, even though relatively small auxiliary engines are installed.

Most of the above advantages involve a substantial weight reduction.

Moreover, an aerodyne according to the invention equipped with two lateral engines only or two lateral engines together with a central engine or several auxiliary engines with air intakes on the fuselage, affords further specific advantages as a consequence of the lateral engines being fixed on box-beams. The fuselage structure, in the region where the engines are fixed, is then so designed as to facilitate the replacement of a type of engine by a more powerful or improved one, this advantage being all the more important as different makes of engine may have quite different fixing means. Such a fixing arrangement also permits to so adjust the position of the engine as to maintain a proper balance, owing to the possible displacement of the nacelle for compensating weight variations or changes in the aerodyne installations or duties.

In order that the invention may be understood more clearly, some embodiments thereof will now be described by way of examples with reference to the accompanying drawings, in which.

Figures 1, 2:
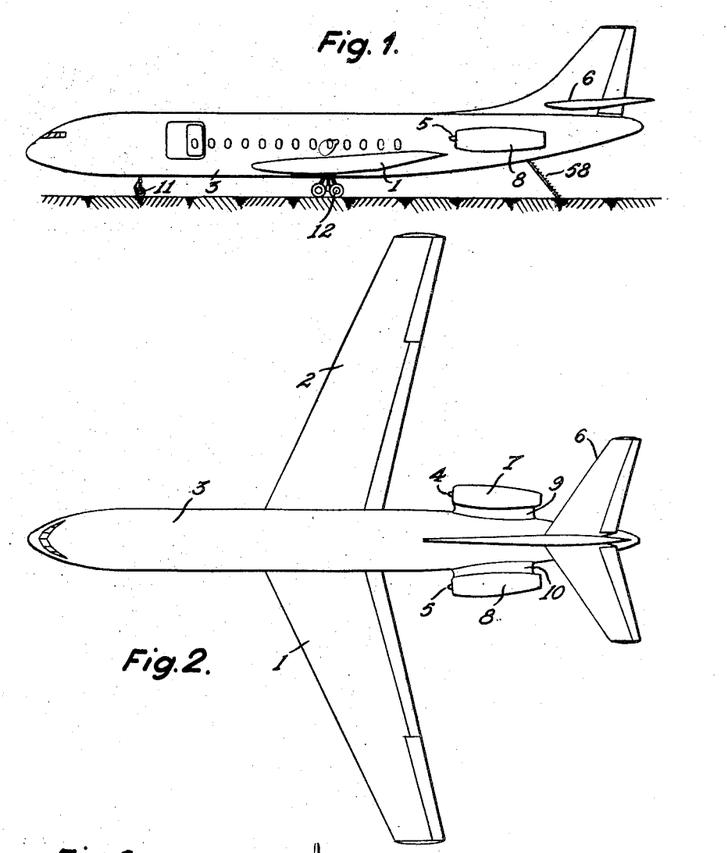
Figs. 1, 2, 3 are respectively side, plan and front views of an aircraft according to the invention with propelling jet engines.
Figure 3:
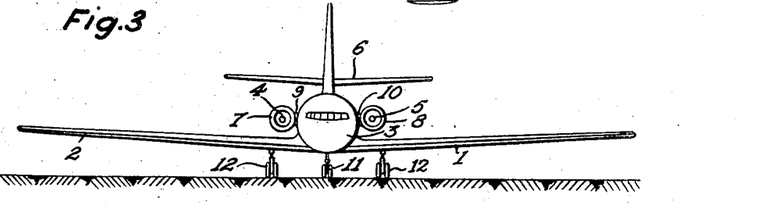

Referring to Figs. 1 to 3, there is illustrated a monoplane aircraft with two low swept-back wings 1, 2 mounted on a fuselage 3 provided with horizontal control surfaces 6 mounted at the aft of said fuselage at a level higher than that of said wings. This aircraft is equipped with two lateral jet engines 4, 5 axially positioned as well as longitudinally as vertically between the wings 1, 2 and the horizontal control surfaces 6 in supporting nacelles 7, 8 structurally independent from the fuselage to which said nacelles are joined through fairings 9, 10. Said lateral jet engines 4, 5 have their axes positioned near and preferably above the horizontal plane passing through the longitudinal axis of the aircraft, said axis being substantially parallel to the longitudinal plane of symmetry of the aircraft.

This aircraft is carried by retractable landing gear 11, 12 which is relatively low as compared with the conventional landing gear of aircraft of similar types, due to the high location of the lateral engines.

Figures 4, 5:
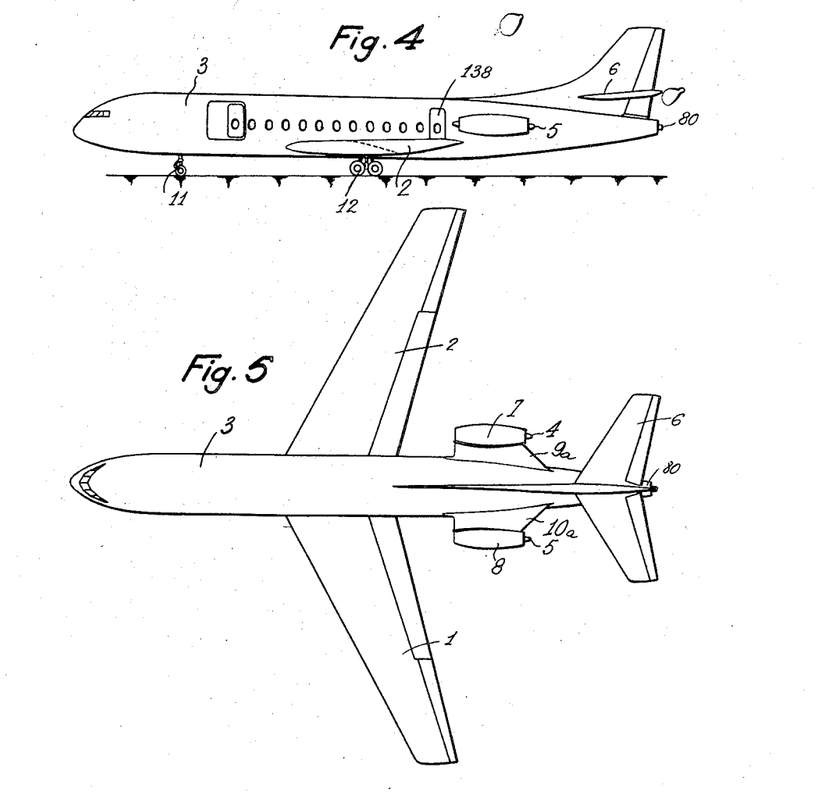
Figs. 4, 5, 6 are respectively side, plan and front views of an aircraft according to the invention equipped with three jet engines and provided with a double air intake for the central engine.
Figure 6:
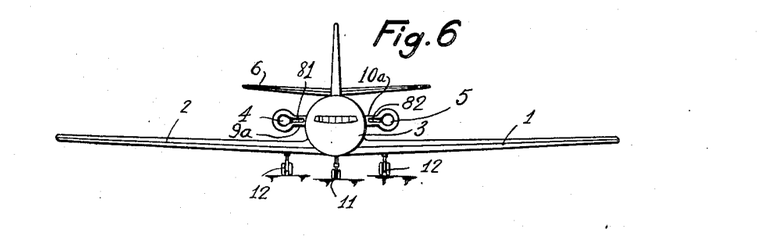

The aircraft illustrated in Figs. 4 to 6 is equipped with three jet engines, namely two lateral engines 4 and 5 and a central engine 80. The lateral engines 4 and 5 are located behind the wings 1, 2 and are accommodated in nacelles 7, 8 connected with the fuselage through streamlined supporting structures 9a, 10a wherein gills 81 and 82 are provided for feeding air to the central jet engine 80 by means of suitable ducts located within said structures. The axes of the lateral jet engines 4 and 5 are substantially in the horizontal plane passing through the longitudinal axis of the aircraft, that is the plane containing the axis of the central engine 80.

In the illustrated examples, the aircraft is equipped with turbo-jet engines, but the jet propulsion engines could be of any other type, such as ram-jet or pulse-jet engines for instance, or alternatively afford the combination in one unit of a pulse-jet and a ram-jet propulsion, as described in the U. S. patent application Serial No. 31,915 filed June 9, 1948, for "Jet Propulsion Engines" by Louis Jules Marnay, assigned to Societe Nationale de Constructions Aeronautiques and granted as Patent No. 2,675,196.

An aircraft with three jet engines may also have power units different from one another, although all belong to the class of jet propulsion engines.

Figure 7:
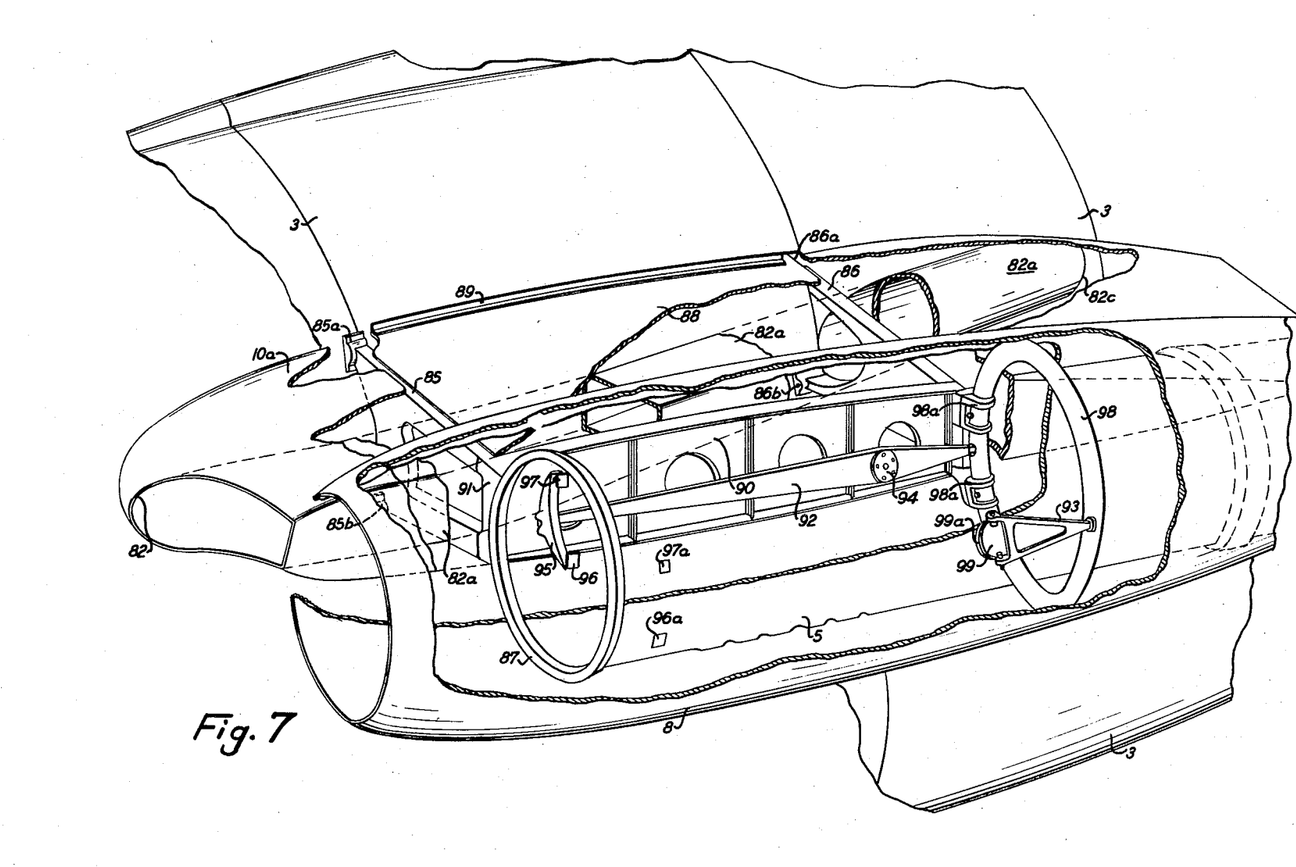
Fig. 7 is a perspective view of a left side engine supporting structure, this engine being assumed to be transparent for the sake of illustration, the fairing of said engine and that of the supporting structure being partially cut away.

The lateral jet engines 4 and 5 may be secured on the fuselage either by means of fixed supporting structures as illustrated in Fig. 7 or by means of supports the position of which is adjustable along the fuselage as shown in Figs. 8 to 11.

In the embodiment shown in Fig. 7, the supporting structure of the turbo-jet engine 5 which is mounted laterally with respect to the aerodyne has the shape of a rigid box. Said structure is constituted by two vertical brackets 85 and 86, each of which is secured at two points 85a—85b or 86a—86b on reinforced transverse frames of the fuselage. The forward bracket 85 carries an angle section ring 87 which is used for the front fixation of the turbo-jet engine. The brackets 85 and 86 are interconnected by top and bottom fairing members 88 provided at their inner side with a strengthening element 89 which is secured to the fuselage wall and at their outer side with a strong vertical marginal rib 90, so that in effect a rigid box structure is constituted.

The foward ring 87 is fixed to the bracket 85 through a fitting 91 and the jet engine 5 introduced into the ring from the rear is held therein by a resilient ring, in rubber for example, which bears against a forward groove normally formed on its intake casing.

The casings of the turbo-jet engine are formed, in a known way, with securing flats. Generally said flats include four front flats formed on the intake casing, flats 96a, 97a and two flats symmetrical with respect to the longitudinal vertical plane of symmetry of the engine, and two rear flats formed on the intake casing of the combustion chamber, flat 99a and one flat symmetrical thereto with respect to said plane of symmetry, said two last flats being located in front of and near to the center of gravity of the engine. The suspension according to the invention has been designed so as to facilitate the mounting and the removal of the turbo-jet engine, by locating further back the fixation point of said engine by means of a suspension device including levers fixed to the jet engine before mounting it on the aircraft. Said suspension device comprises a big lever 92 secured on the side of the turbo-jet engine which faces the fuselage, simultaneously on the corresponding front and rear securing flats, and a small lever 93 secured on the side of said engine which is opposite to the fuselage, on the corresponding rear securing flats. The big lever 92 is fulcrumed on a ball and socket fixture not shown and which is carried by a support 94 secured on the rear securing flats symmetrical to flat 99a. The fore end of the longer arm of lever 92 is fixed to two supports 96, 97 secured on the front securing flats symmetrical to flats 96a and 97a through a fork 95 on the arms of which are pivotally mounted said supports about vertical axes and the tail of which carries a vertical spindle on which pivots the fore end of said lever 92. The end of the shorter arm of lever 92 is attached through a ball and socket joint to a rear ring 98 passed around the jet engine from the rear and fixed to the rear bracket 86 through a pair of bolted fittings 98a at the time the jet engine is mounted.

The small lever 93 is so mounted as to yield to lateral stresses in order to allow free radial expansions of the jet engine. This lever pivots at its forward end about a vertical axis in a plate 99 carried by the rear securing flat 99a and is attached to ring 98 through a ball and socket device, the hemispherical sockets of which, that enclose the ball, may slide in a direction parallel to the longitudinal axis of the aircraft.

Figures 17, 18:
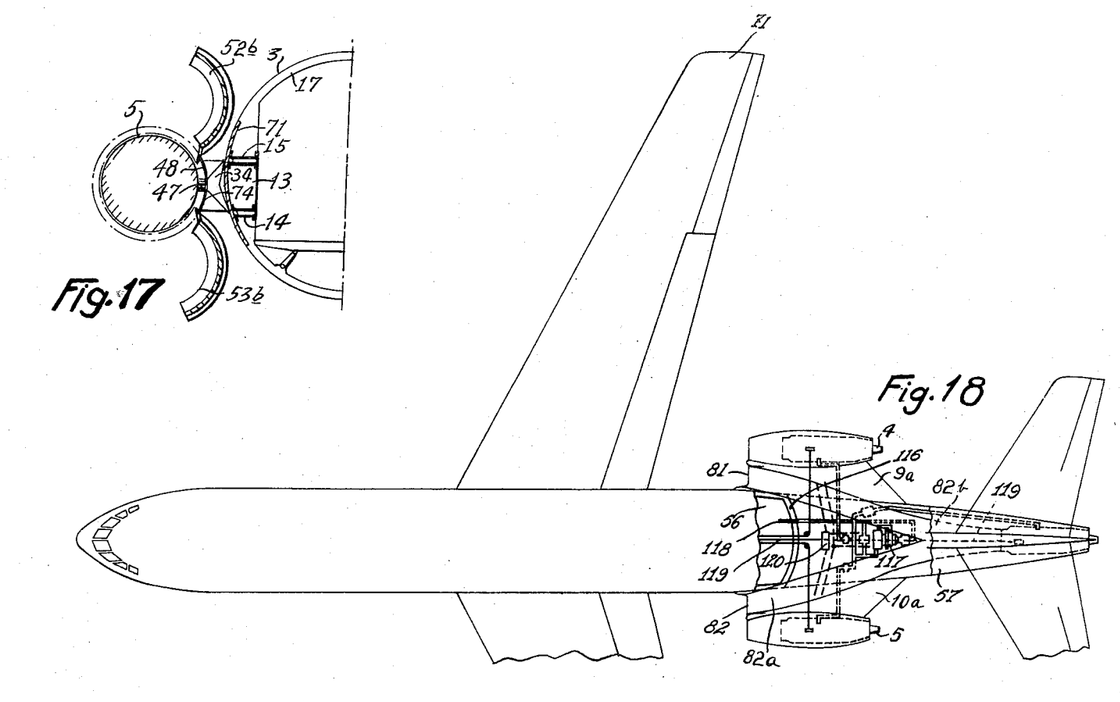
Fig. 17 is a view similar to Fig. 16, wherein a protective armour is fixed on the fuselage.
Fig. 18 is a partial plan view at a greater scale of an aircraft equipped with three jet engines, showing also the accommodation of the auxiliary equipments in the rear part and the travel of the controls from the pilot's compartment, with parts cut away.

The rigid box which supports the turbo-jet engine 5 is covered by a streamlined structure for maintaining the continuity of the aerodynamic forms between the fuselage 3 and the nacelle 8. If the embodiment illustrated in Figure 7 is applied to an aircraft of the type illustrated in Figs. 4 to 6, i. e. an aircraft having two lateral and one central turbo-jet engines, the streamlined supporting structure 10a which houses the brackets 85 and 86 is provided with a gill 82 for feeding air to the central jet engine 80 through an air duct 82a which is located within the rigid box, penetrates through the fuselage 3 at 82c and, in the known manner, ends into the main intake duct for jet engine 80 as well as the air duct which is fed with air by the gill 81 formed on the streamlined structure 9a associated with the other lateral turbo-jet engine 4 (Figs. 6 and 18).

Figure 8:
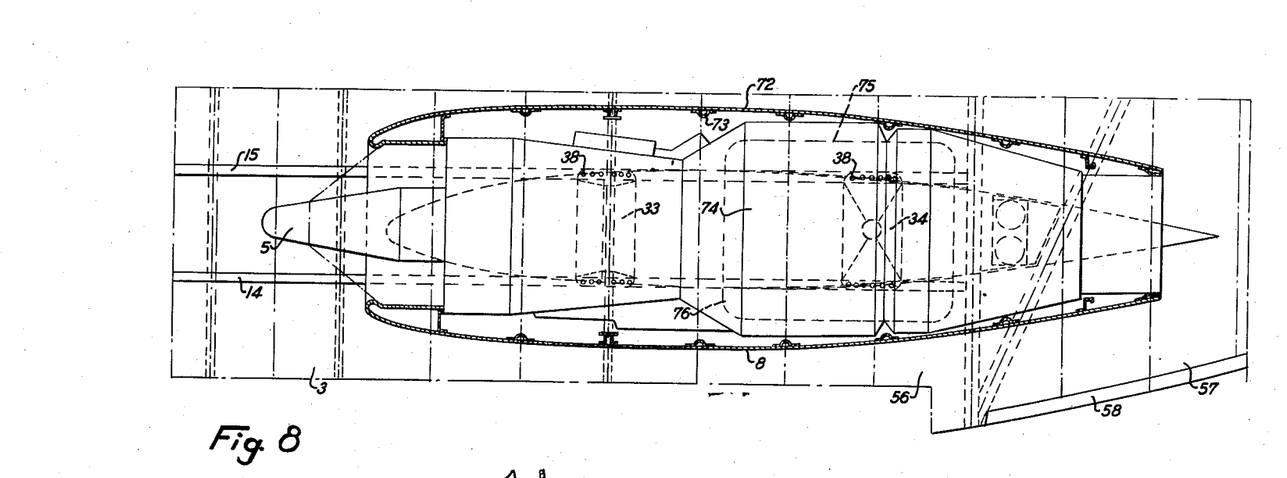
Fig. 8 is an elevational view at a greater scale showing another mounting of a left side engine, the shown portion of the fuselage being viewed from outside and the engine nacelle being shown in longitudinal section.
Figures 9, 12:
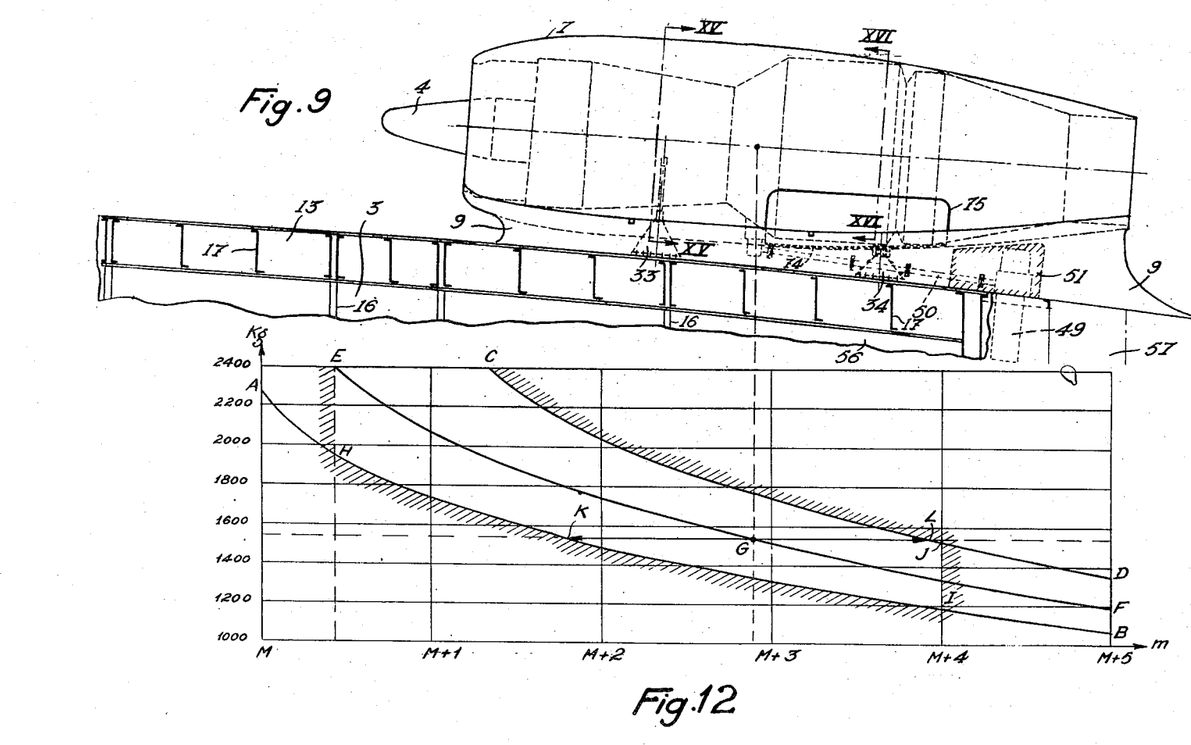
Fig. 9 is a plan view of the mounting for a right-side engine corresponding to Fig. 8, the right-hand engine supporting nacelle being viewed from above and the fuselage partially cut away.
Fig. 12 is a diagram showing the mounting range of the engines when utilizing the mounting illustrated in Figs. 8 to 11.
Figure 10:
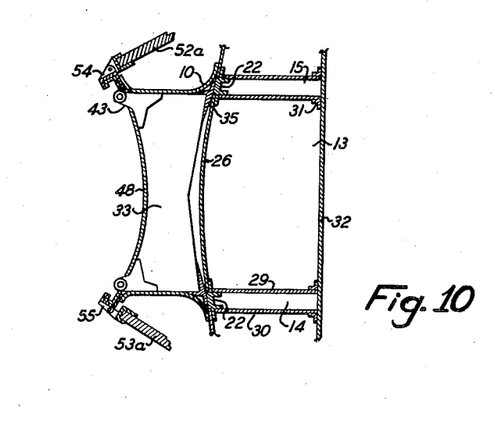
Fig. 10 is an elevational and sectional view showing the mounting of the intermediate fore-bracket used for the fixation of the jet engine illustrated in Figs. 8 and 9.
Figure 11:
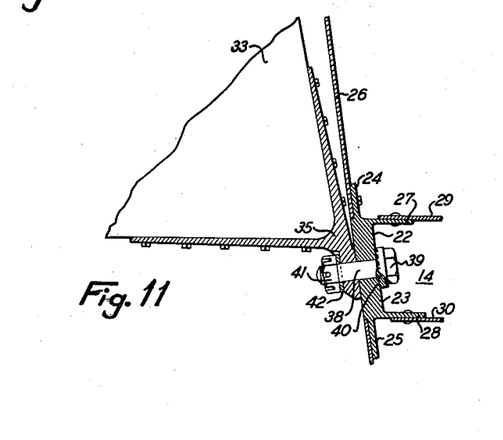
Fig. 11 represents at a greater scale the mode of fixation of the brackets used in the mounting illustrated in Figs. 8 and 9.

Referring to Figs. 8, 9, 10 and 11, the fuselage 3 illustrated therein is provided, in the area where each lateral engine is to be secured, with a special structure positioned about mid-height of the fuselage between the wings and the fins. Said structure comprises a box-beam 13 constituted by two box-members 14, 15 both parallel to the longitudinal axis of the fuselage. Said box-members rest on transverse frames of the fuselage such as frames 16, 17 schematically illustrated in Figs. 15, 16, the frame 16 (Fig. 15), having special bracing members 18, 19, 20 and 21. Each of beam members 14, 15 is constituted by a channel section 22 having a thick web 23 (Fig. 11) with two auxiliary side extensions 24, 25 to ensure a continuous outer fuselage surface. The two auxiliary side extensions 24 pointing to each other from the two parallel box-members 14, 15 constituting the box-beam 13 are connected by a plate 26 matching the shape of the fuselage. The inner flanges 27, 28 of each channel section 22 are prolonged by metal sheets 29, 30 connected through section members, such as angles 31, to an inner plate 32 joining together the two beam members 14, 15 (Fig. 10). Said inner plate 32 has vertical cross-sections parallel to the longitudinal plane of symmetry of the fuselage and is cambered lengthwise according to the horizontal mean curvature of the fuselage wall.

The jet engine 5 is mounted on the left-hand box-beam 13 and is secured thereto by means of two intermediate brackets made in any known manner, namely the fore-bracket 33 and the rear-bracket 34 (Figs. 8 and 9) and fixed on the box members 14 and 15 through angles 35 by means of bolts 38 (Fig. 11) passing through holes spaced along two parallel lines in the thick webs 23 of channels 22, the strength and the spacing of said bolts 38 being in accordance with the forces and the moments to be transmitted to the fuselage. Each bolt 38 is formed under its head 39 with an annular groove wherein is accommodated an annular gasket 40 which, owing to the clamping action of nut 41 and washer 42, seals the bolt hole.

Figure 15:
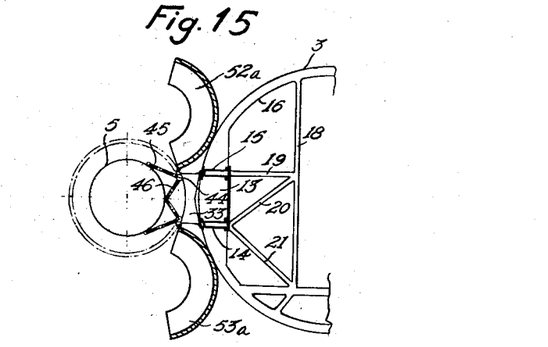
Figs. 15 and 16 are sections of Fig. 9 taken respectively on lines XV—XV and XVI—XVI, the cowlings of the nacelle being open.

The intermediate fore bracket 33 supports adjacent the engine a pair of connecting forks 43 wherein are mounted ball and socket hinges 44 connected to the engine by a structure made of tube elements 45, 46 (Fig. 15). The whole assembly is adapted to support a component of the weight and the cantilever moment of said weight, that is only stresses located in the transverse plane.

The intermediate rear-bracket 34 is directly fixed to the engine at one point 47 only (Fig. 16), and the connection may comprise a tightly adjusted ball and socket joint to permit expansion. This bracket is adapted to transmit part of the weight and the whole thrust.

The intermediate brackets 33, 34 carry the streamlined element 9 or 10 through which the outer form of the nacelle 7 or 8 of the engine is connected to the fuselage surface and also carry a marginal rib 48 which is common to said streamlined element and said engine nacelle. Within said streamlined element is accommodated part of the control assembly of the engine auxiliaries 49 which is connected to the engine through a transmission shaft 50. Said streamlined element is also provided with an inspection trap 51 adjacent said control assembly (Fig. 9).

Since the intermediate fore- and rear-brackets are fixed to the box-beam 13 in the same manner by bolts 38 and angle sections 35, it will be appreciated that an engine may be readily replaced by another engine of a different type, more powerful or improved by modifying the intermediate brackets. Moreover to make up for changes to the weight, to the installation, or to the duties of the aircraft, the location of the engine may be adjusted by displacing the intermediate brackets of a given engine along the box-beam 13.

The Fig. 12 shows the possible mounting range of lateral engines according to their weight so as to comply with the positioning conditions resulting from the use of the aircraft in accordance with the duties to be performed. The weight of a lateral engine is quoted in ordinates against the horizontal distance in meters from the center of gravity G of each lateral engine to the nose of the fuselage. The center of gravity G may be located, according to the weight of the engine, between the curve A—B representing the foremost locations and the curve C—D representing the rearmost locations, these curves being limited by the verticals H—E and I—J which correspond to the extreme forward or backward positions according to the field of utilization of aircraft. The middle curve E—F represents the mean location which, in the illustrated example may vary between 25 m. for an engine weighing 1,340 kg. to 21.40 m. for an engine weighing 2,400 kg. (M being equal to 21 m. in this example). The engine shown in the Figure 9 may be so displaced as to have its center of gravity G at any point along the line K—L.

Figure 13:
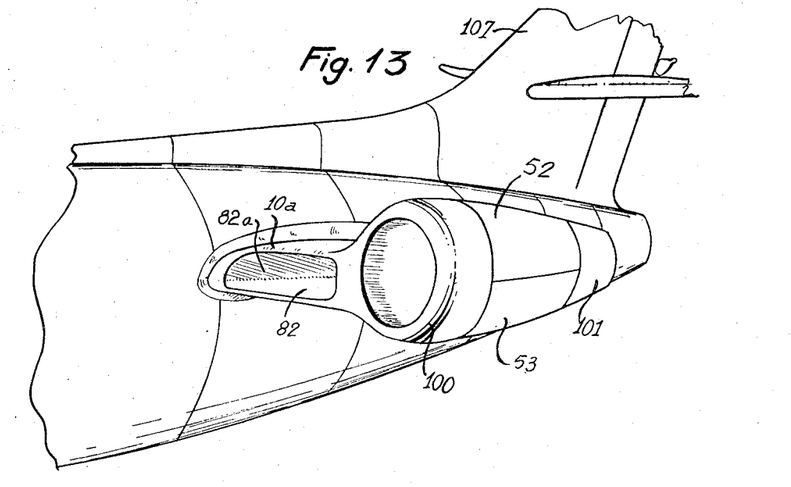
Fig. 13 is a perspective view of the rear left side of an aircraft structure to be equipped with three jet engines, the central engine having two air intakes.
Figure 14:
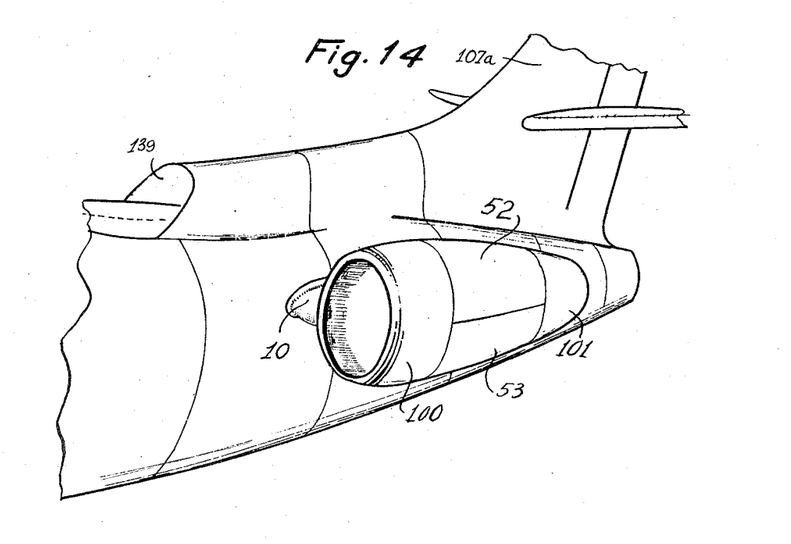
Fig. 14 is a perspective view similar to Fig. 13, but the central engine being fed through a single air intake located above the fuselage.
Figure 16:
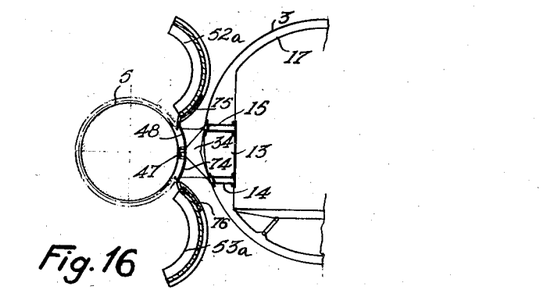

In the embodiment illustrated in Figures 13 and 14, the nacelle of a lateral jet engine comprises a fixed tubular fore-part 100, a removable tubular rear part 101 and an intermediate part formed of two cowlings 52 and 53 pivoted as illustrated in Figs. 15 and 16 so as to open respectively upwards and downwards. This nacelle is prolonged by a fairing, which fairing 10a in Figure 13 accommodates the intake duct 82a of the central jet engine while the fairing 10 of Figure 14 is closed. If in said last case the aircraft is equipped with three jet engines, as in Figs. 4 to 6, the central engine mounted within the tail of the fuselage is then fed with air through an air intake 139 formed on the top of the fuselage as a continuation of the forward fairing surface of the lower part of fin 107a. The air passes from said intake 139 to the central engine in the known way.

In the embodiment illustrated in Figs. 8, 9, and 10, the two semicircular upper, 52a and lower, 53a cowlings of the nacelle are respectively connected through hinges 54, 55 to marginal rib 48. Each cowling is constituted by a metal plate 72 shaped to suit the engine and reinforced by ribs 73 in channel strip metal riveted on the metal plate 72. The cowlings when closed are held in a known manner by retracting catches not shown.

When the jet engines consist of turbo-jet engines the turbines of which are liable to burst, a complementary protection is obtained by means of armour plates such as the plates 74, 75, 76 respectively fixed on the marginal rib 48 and on the upper and lower nacelle cowlings 52a and 53a (Figs. 8, 9 and 16) or as the plate 71 fixed on the fuselage 3 (Fig. 17).

Figure 19:
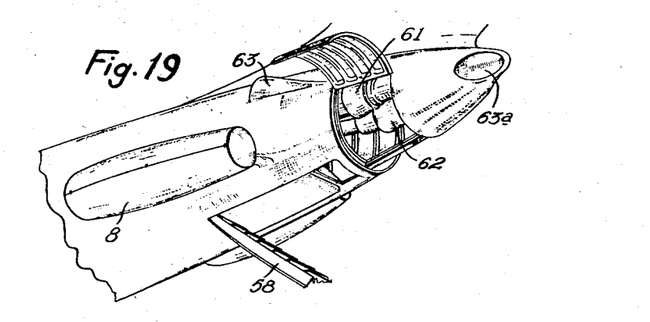
Fig. 19 illustrates in perspective view from the lefthand side of the fuselage tail of an aircraft equipped with lateral jet engines and central auxiliary engines, with a structural ladder provided in the fuselage.

The fuselage 3 comprises an air-tight cabin 56 which extends from the fuselage-nose to the vicinity of the control assembly of the engine auxiliaries and a non-sealed rear part 57 (Fig. 18), wherein is provided a central structural ladder 58 located axially of the aircraft and opening downwards at the bottom thereof (Fig. 19). Said built-in ladder permits the passengers, for instance, to have access to the interior of the aircraft by passing through a sealed door provided in the air-tight frame 116 of the cabin back wall.

The non-sealed cabin 57 permits to group the accessories in the tail adjacent to the engine so as to facilitate maintenance.

Owing to the arrangement of the jet engines behind the wings, all the auxiliaries thereof may be accommodated in the non-sealed space 57 behind the air-tight cabin 56 wherein the passenger seats and the pilot's controls are installed. Owing to such an arrangement as shown in Fig. 18 relating to an aircraft having three-jet engines, a minimum number of passages will have to be provided through the air-tight cabin wall 116. Thus, for example, the unit 117 for cooling the air supply and for pressurizing the air-tight cabin is connected thereto by a single pipe 118 passing through the wall 116 of said cabin. Similarly, the control lines 119 from the pilot's compartment to the three jet engines are grouped together and pass through the wall 116 of the air-tight cabin 56 at a single point. Moreover the relay 120 for operating engine auxiliaries is also located in the non-sealed space 57. An easy access to the engines and auxiliaries thereof is thus provided and consequently any repair or engine replacement may be readily effected.

As the passenger cabin extends back to adjacent the rear door 138 (Fig. 1), it will be seen that said cabin is in front of the side engines and this arrangement affords an improved safety for the passengers in the occurrence of engine fire or explosion.

The aircraft illustrated in Figs. 1, 2, 3 is equipped only with the two lateral engines 4, 5. As shown in Fig. 19, said aircraft could be equipped also with two auxiliary jet engines 61, 62 of small power accommodated in the tail of the fuselage, said engines being fed with air by side intakes 63 provided on the sides of the fuselage and discharging exhaust gases through lateral ports 63a.

It is quite obvious that, without departing from the scope of the invention, various modifications may be made to the above described embodiments.

What I claim is:

1. A monoplane aircraft comprising, in combination, a fuselage, wings fixed on said fuselage, horizontal tail-surfaces mounted aft on said fuselage at a level higher than that of said wings, two jet engines positioned laterally on the outside of said fuselage on either side thereof, at an intermediate level with respect to those of said wings and horizontal tail-surfaces and in the longitudinal direction at an intermediate position between said wings and horizontal tail-surfaces, and supporting structures respectively connecting said jet engines to the fuselage.

2. An aircraft comprising, in combination, an elongated fuselage, supporting wings on said fuselage at a location spaced from the aft end thereof, horizontal control surfaces mounted on said fuselage adjacent the aft end thereof, two jet engines fixed laterally of said fuselage on either side thereof, said jet engines being vertically spaced above said wings and below said horizontal control surfaces and positioned in the longitudinal direction of said fuselage at an intermediate location between said wings and horizontal control surfaces, and supporting structures respectively connecting said jet engines to said fuselage.

3. An aircraft, according to claim 2, wherein each supporting structure comprises at least one jet engine supporting device mounted on the corresponding side of the fuselage and outwardly projecting therefrom, a streamlined nacelle laterally spaced from the fuselage for housing the corresponding jet engine, and a streamlined element for housing each supporting device and simultaneously connecting said nacelle with the fuselage.

4. An aircraft, according to claim 3, wherein the jet engines consist of turbo-jet engines, said aircraft further comprising protective armour plates secured in register with the turbines of the turbo-jet engines in the connecting area of the streamlined elements with the nacelles and on said nacelles.

5. An aircraft, according to claim 2, wherein the jet engines consist of turbo-jet engines, said aircraft further comprising protective armour plates respectively secured on the fuselage in register with the turbines of the turbo-jet engines.

6. An aircraft, according to claim 2, wherein the fuselage comprises a front air-tight cabin extending from the fuselage-nose to the vicinity of the front part of the jet engines, a non-sealed rear compartment, and engine accessories grouped in said compartment adjacent to the jet engines.

7. An aircraft, according to claim 2, wherein each supporting structure comprises a reinforced structure carried by the fuselage at the level of the corresponding jet engine and longitudinally extending, intermediate brackets laterally projecting from the fuselage and carrying the jet engine, means for securing said intermediate brackets on said reinforced structure in a longitudinally adjustable position with a view to compensate weight variations and changes in the aircraft installations and duties in order to maintain a proper means balance for said aircraft, a streamlined nacelle laterally spaced from the fuselage for housing the corresponding jet engine, and a streamlined element for housing the intermediate brackets and simultaneously connecting said nacelle with the fuselage.

8. An aircraft, according to claim 7, wherein the reinforced structure consists of a longitudinal box-beam fixed on the fuselage about mid-height thereof and contained in the bulk of said fuselage, said box-beam having longitudinal lines of transverse holes, and wherein the means for securing the intermediate brackets on the reinforced structure comprise bolts to fix said brackets through selected holes of said longitudinal box-beam which are determined according to the proper mean balance to be obtained for the aircraft.

9. An aircraft, according to claim 2, further comprising in the rear tail of the fuselage at least one rear jet engine, and, for each rear jet engine, a supporting assembly mounted on the structure of said fuselage.

10. An aircraft, according to claim 9, having a fin with a faired forward portion further comprising, for each rear jet engine, an air intake provided on the fuselage substantially as a continuation of the forward faired portion of the lower part of said fin.

11. An aircraft, according to claim 9, wherein each supporting structure comprises at least one jet engine supporting device mounted on the corresponding side of the fuselage and outwardly projecting therefrom, a streamlined nacelle structurally independent from the fuselage for housing the corresponding jet engine, and a streamlined element for housing each supporting device and simultaneously connecting said nacelle with the fuselage, said aircraft further comprising two air intakes respectively beginning on the front parts of said streamlined elements, passing through the supporting devices and ending in an air central duct for feeding with air each rear jet engine.

References Cited in the file of this patent

UNITED STATES PATENTS

| | | |
|---|---|---|
| D. 163,819 | Risico | July 3, 1951 |
| 1,611,353 | Lepinte | Dec. 21, 1926 |
| 1,766,390 | Lapin | June 24, 1930 |
| 1,981,237 | Loughhead | Nov. 20, 1934 |
| 2,085,761 | Lysholm | July 6, 1937 |
| 2,178,998 | Scott | Nov. 7, 1939 |
| 2,405,878 | Elivert | Aug. 13, 1946 |
| 2,422,744 | O'Neil | June 24, 1947 |
| 2,426,537 | Van Dorn | Aug. 26, 1947 |
| 2,496,509 | Wolf | Feb. 7, 1950 |
| 2,506,976 | Tharratt | May 9, 1950 |
| 2,516,671 | Bowers et al. | July 25, 1950 |
| 2,544,830 | Grill et al. | Mar. 13, 1951 |
| 2,605,062 | Tyler | July 29, 1952 |
| 2,633,312 | Hagger | Mar. 31, 1953 |

FOREIGN PATENTS

| | | |
|---|---|---|
| 396,015 | Germany | May 24, 1924 |
| 987,970 | France | Apr. 25, 1951 |